United States Patent
Nakata

(10) Patent No.: US 9,661,008 B2
(45) Date of Patent: May 23, 2017

(54) NETWORK MONITORING APPARATUS, NETWORK MONITORING METHOD, AND NETWORK MONITORING PROGRAM

(71) Applicant: NIPPON TELEGRAPH AND TELEPHONE CORPORATION, Chiyoda-ku (JP)

(72) Inventor: Kensuke Nakata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 14/769,666

(22) PCT Filed: Feb. 21, 2014

(86) PCT No.: PCT/JP2014/054190
§ 371 (c)(1),
(2) Date: Aug. 21, 2015

(87) PCT Pub. No.: WO2014/129587
PCT Pub. Date: Aug. 28, 2014

(65) Prior Publication Data
US 2016/0014146 A1    Jan. 14, 2016

(30) Foreign Application Priority Data

Feb. 21, 2013  (JP) .................................. 2013-032587
Feb. 25, 2013  (JP) .................................. 2013-034529

(51) Int. Cl.
*H04L 29/06* (2006.01)
*H04L 12/64* (2006.01)
*H04L 29/08* (2006.01)

(52) U.S. Cl.
CPC ...... *H04L 63/1416* (2013.01); *H04L 12/6418* (2013.01); *H04L 63/0236* (2013.01); *H04L 63/0281* (2013.01); *H04L 67/02* (2013.01)

(58) Field of Classification Search
None
See application file for complete search history.

(56) References Cited

U.S. PATENT DOCUMENTS 6,711,615 B2 *   3/2004   Porras ................. H04L 12/2602
                                                    709/224
7,661,136 B1    2/2010   Spielman
(Continued)

FOREIGN PATENT DOCUMENTS

JP    2005 210601    8/2005
JP    2006 115007    4/2006
(Continued)

OTHER PUBLICATIONS

"Geographical Routing Using Partial Information for Wireless Ad Hoc Networks"; Jain et al; IEEE; 1999.*
(Continued)

*Primary Examiner* — Jason Lee
(74) *Attorney, Agent, or Firm* — Oblon, McClelland, Maier & Neustadt, L.L.P.

(57) ABSTRACT

A network monitoring apparatus includes a log collecting unit and a log analyzing unit. The log collecting unit collects log information related to passing packets from at least one of a FW and a proxy server, which are included in a network, for packets transferred in the network. The log analyzing unit extracts log information satisfying a predetermined condition in a predetermined time period by analyzing, over time, the log information collected by the log collecting unit.

9 Claims, 8 Drawing Sheets

(56) References Cited

U.S. PATENT DOCUMENTS

| | | | |
|---|---|---|---|
| 2005/0114708 A1* | 5/2005 | DeStefano | H04L 63/1425 726/4 |
| 2009/0055919 A1 | 2/2009 | Komura et al. | |
| 2010/0050260 A1 | 2/2010 | Nakakoji et al. | |

FOREIGN PATENT DOCUMENTS

| | | |
|---|---|---|
| JP | 2006-295232 A | 10/2006 |
| JP | 2008 219149 | 9/2008 |
| JP | 2009 44665 | 2/2009 |

OTHER PUBLICATIONS

Japanese Office Action issued Aug. 25, 2015 in Patent Application No. 2015-501520 (with English Translation).
Kasama et al., "Malicious Traffic Detection based on Multimodal Analysis", IEICE Technical Report, vol. 112, No. 315, (Nov. 15, 2012), pp. 25-30, with English translation.
International Search Report Issued May 13, 2014 in PCT/JP14/054190 Filed Feb. 21, 2014.
Extended European Search Report issued Nov. 16, 2016 in Patent Application No. 14754256.7.

* cited by examiner

FIG.3

| DATE/TIME | DESTINAT-ION IP ADDRESS | SOURCE IP ADDRESS | DESTINA-TION PORT | SOURCE PORT | PROTO-COL | TRANS-MITTED SIZE | RECEIVED SIZE | DESTINA-TION URL | USER AGENT | REQUEST METHOD | DETER-MINATION RESULT |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |

[1]: COMMUNICATION WITH MALICIOUS SITE
[2]: INTERNAL INVESTIGATION ACTIVITY
[3]: COMMUNICATION WITH ATTACKER AND TAKE-OUT OF DATA

NETWORK MONITORING APPARATUS, NETWORK MONITORING METHOD, AND NETWORK MONITORING PROGRAM

FIELD

The present invention relates to a technique for assisting in detection of cyber attacks from an external network, such as the Internet, and information leakage to the external network.

BACKGROUND

In recent years, unauthorized communication (cyber attacks), which attacks various services provided via networks and infrastructure, is evolving into those using diverse techniques day after day and its threat is increasing more and more. Known countermeasure techniques against such unauthorized communication include, for example, FireWalls (FWs), Intrusion Detection Systems (IDSs), and Intrusion Prevention Systems (IPSs). FIG. 8 is a diagram illustrating an example of a countermeasure technique according to conventional art.

For example, as illustrated in FIG. 8, a FW, which serves as a packet filtering function of a network device, such as a router, or as a dedicated device, is arranged at a connection point between an internal network and an external network. Rules are set by a user of a terminal included in the internal network, for example, such that the FW: passes only packets of a service that the terminal included in the internal network provides to a terminal of the external network, and packets for the terminal of the internal network to use a service provided by the terminal of the external network; and discards any other packets.

Further, for example, an IDS/IPS is provided as a function of the network device, such as the router, or as a dedicated device. As illustrated in FIG. 8, known types of the IDS/IPS include, for example: a signature type, which detects an attack by matching obtained packets with a predefined pattern of attacking packets; and an anomaly type, which detects abnormal traffic by using obtained packets, or various logs collected from the network device and statistical information to monitor the traffic and analyzing the monitored data.

In one example of the signature type, as illustrated in FIG. 8, packets are obtained at a point after passing the FW, whether or not any illegal bit string is included in the packets is determined, and if any illegal bit string is present therein, abnormality is detected. Further, for example, in the anomaly type, a normal state is defined for behaviors, such as addition of a resource and a communication quantity in a terminal of the internal network, and if there is deviation therefrom, abnormality is detected. In the above described techniques, if abnormality is detected, for example, as illustrated in FIG. 8, by an alert being output, a network administrator is notified of the abnormality.

CITATION LIST

Patent Literature

Patent Literature 1: Japanese Patent Application Publication No. 2008-219149
Patent Literature 2: Japanese Patent Application Publication No. 2006-115007
Patent Literature 3: Japanese Patent Application Publication No. 2005-210601

SUMMARY

Technical Problem

However, the above described conventional techniques had a certain limit as countermeasure techniques against unauthorized communication. For example, the FW has had a certain limit as a countermeasure technique, as the FW determines possibility of passage, packet by packet, and is thus unable to recognize communication of an attacker just by singly looking at a log related to a packet that has passed upon success of an attack. Further, for example, since the IDS/IPS of the signature type is based on the predefined patterns, response to an unknown attack is delayed and it has had a certain limit as a countermeasure technique. Furthermore, for example, with the IDS/IPS of the anomaly type, erroneous detection will be frequent if a normal state is defined too strictly, and thus thorough detection of unauthorized communication will be difficult and it has had a certain limit as a countermeasure technique.

Therefore, techniques according to the present application have been made in view of the above described problems of the conventional art, and aims to provide a network monitoring apparatus, a network monitoring method, and a network monitoring program, which allow unauthorized communication to be detected highly accurately.

Solution to Problem

To solve the problems described above and achieve the object, a network monitoring apparatus, which is provided in a network that includes a FireWall provided on at least one of a connection point with an external network and an internal segment dividing point and a proxy server for Web access and that transfers IP packets, and which detects communication suspected to be unauthorized, a network monitoring apparatus includes a log collecting unit that collects and stores log data from at least one of the FireWall and the proxy server; and a log analyzing unit that makes inquiry for log data to the log collecting unit, analyzes, according to a set analysis condition, the log data, and outputs a result of the analysis, wherein the log data stored by the log collecting unit are information including at least one of: 5-tuples; transmitted sizes; received sizes; information extracted from http headers; and time stamps, and the information extracted from http headers includes at least one of: destination URLs; User-Agent; and request methods.

Advantageous Effects of Invention

A network monitoring apparatus according to the present application allows unauthorized communication to be detected highly accurately.

BRIEF DESCRIPTION OF DRAWINGS

FIG. 3 is a diagram illustrating an example of a configuration of log information stored in a log DB according to the first embodiment.

DESCRIPTION OF EMBODIMENTS

Hereinafter, with reference to the appended drawings, embodiments of a network monitoring apparatus, a network monitoring method, and a network monitoring program according to the present application will be described in detail. The network monitoring apparatus, the network monitoring method, and the network monitoring program according to the present application are not to be limited by the following embodiments.

First Embodiment

[Configuration of Network Including Network Monitoring Apparatus According to First Embodiment]

Figure 1:
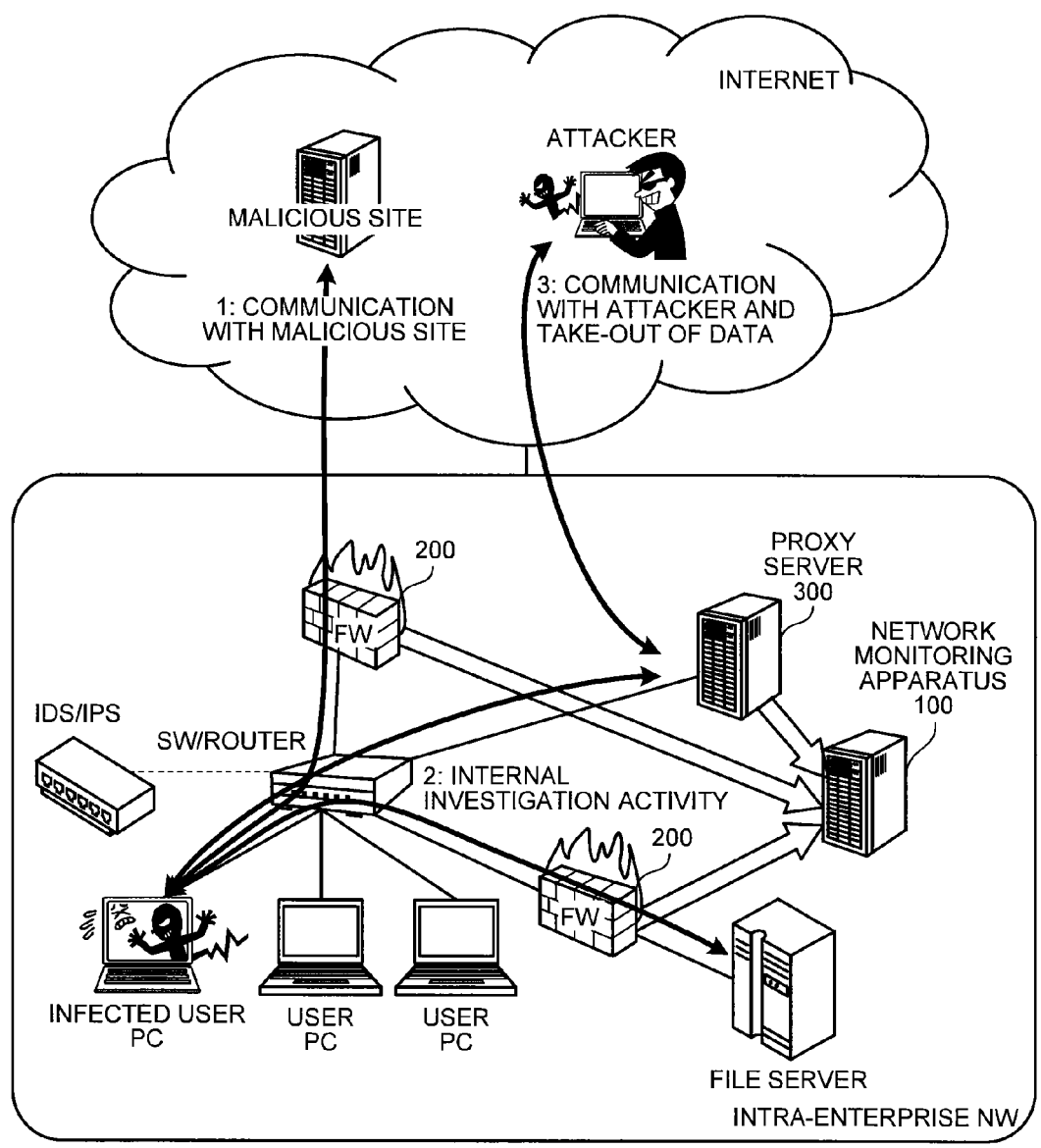
FIG. 1 is a diagram illustrating an example of a configuration of a network including a network monitoring apparatus according to a first embodiment.

First, a configuration of a network including a network monitoring apparatus 100 according to a first embodiment will be described. FIG. 1 is a diagram illustrating an example of the configuration of the network including the network monitoring apparatus 100 according to the first embodiment. For example, the network including the network monitoring apparatus according to the first embodiment is, as illustrated in FIG. 1, an intra-enterprise network (NW), and is connected to the Internet (referred to as, "external network", as appropriate).

The intra-enterprise NW includes, as illustrated in FIG. 1, the network monitoring apparatus 100, a FireWall (FW) 200, and a proxy server 300. Further, the intra-enterprise NW includes, as illustrated in FIG. 1, a user PC, a file server, a switch (SW)/router, an IDS/IPS, and the like. For example, in the intra-enterprise NW, the file server may be accessed by the user PC, or the Internet may be accessed by the user PC via the FW 200. Further, for example, in the intra-enterprise NW, the Internet may be accessed by the user PC via the proxy server 300.

The FW 200 monitors packets in communication executed between the user PC and file server included in the intra-enterprise NW, and a terminal and a server on the Internet. Specifically, the FW 200 controls, based on a condition predefined by a user, transfer of packets between the Internet and the intra-enterprise NW. For example, the FW 200 determines, based on 5-tuple information of a packet (a destination Internet Protocol (IP) address, a source IP address, a destination port, a source port, and a protocol), whether or not the packet is related to unauthorized communication, and if it is determined to be of unauthorized communication, the FW 200 discards the packet. Further, the FW 200 controls connection between the user PC and file server included in the intra-enterprise NW, and the Internet, to be connection going through the proxy server 300. That is, the FW 200 controls the user PC and file server included in the intra-enterprise NW to be not directly connected to the Internet.

Further, the FW 200 monitors packets in communication executed between the user PC and the file server, which are included in the intra-enterprise NW. Specifically, the FW 200 controls, based on a condition predefined by a user, transfer of packets between the user PC and the file server. For example, the FW 200 determines, based on 5-tuple information of a packet, whether or not the packet is related to unauthorized communication, and if it is determined to be of unauthorized communication, the FW 200 discards the packet.

The FW 200 outputs various logs for packets passing itself. For example, the FW 200 outputs, in addition to 5-tuple information of a packet that has passed itself, and information on a passing time of the packet (time stamp for the passage of the packet); information on a result of determination with respect to the packet (result of possibility of the passage), and the like. The above mentioned types of information are just an example, and the FW 200 may output other types of information depending on devices, as appropriate. Further, the FW 200 may output various logs and may also store the various logs.

The proxy server 300 represents the communication between the user PC and file server included in the intra-enterprise NW and the terminal and server included in the Internet. That is, when the user PC or file server included in the intra-enterprise NW accesses the Internet, the proxy server 300 substitutively executes the communication with the terminal or server to be accessed.

Further, the proxy server 300 holds (caches), for a certain time period, files once read in the communication with the terminal and server included in the Internet, and provides the cached files, if similar connection requests are made by the user PC or file server included in the intra-enterprise NW. Further, the proxy server 300 places, based on a destination Uniform Resource Locator (URL) of a packet or the like, restrictions on Web sites to be connected to on the Internet and on connection source user terminals.

The proxy server 300 stores a log of the packets in the communication that the proxy server 300 itself represented. For example, the proxy server 300 stores: information on a connect time of communication, a connection source user terminal, a connection result, transmitted and received packet sizes, an access method, an access destination URL; information on a time at which the communication was performed (a time stamp of the execution of the communication); and the like. The above mentioned types of information are just an example, and the proxy server 300 may store other types of information depending on devices, as appropriate.

The network monitoring apparatus 100 monitors packets transferred in the intra-enterprise NW and detects unauthorized communication highly accurately. Specifically, the network monitoring apparatus 100 detects, as illustrated in FIG. 1, unauthorized communication by collecting information on the packets from the FW 200 and proxy server 300. For example, by collecting from the FW 200 and proxy server 300 and analyzing log information (referred to as "log data" as appropriate), the network monitoring apparatus 100 performs, as illustrated in FIG. 1, detection of: "1: Communication executed between an infected user PC infected with a virus or the like in the intra-enterprise NW and a malicious site on the Internet"; "2: Investigation on unauthorized communication inside the intra-enterprise NW"; "3: Communication between an attacker on the Internet and a server or the like included in the intra-enterprise NW and take-out of data by the attacker"; and the like.

[Configuration of Network Monitoring Apparatus According to First Embodiment]

Figure 2:
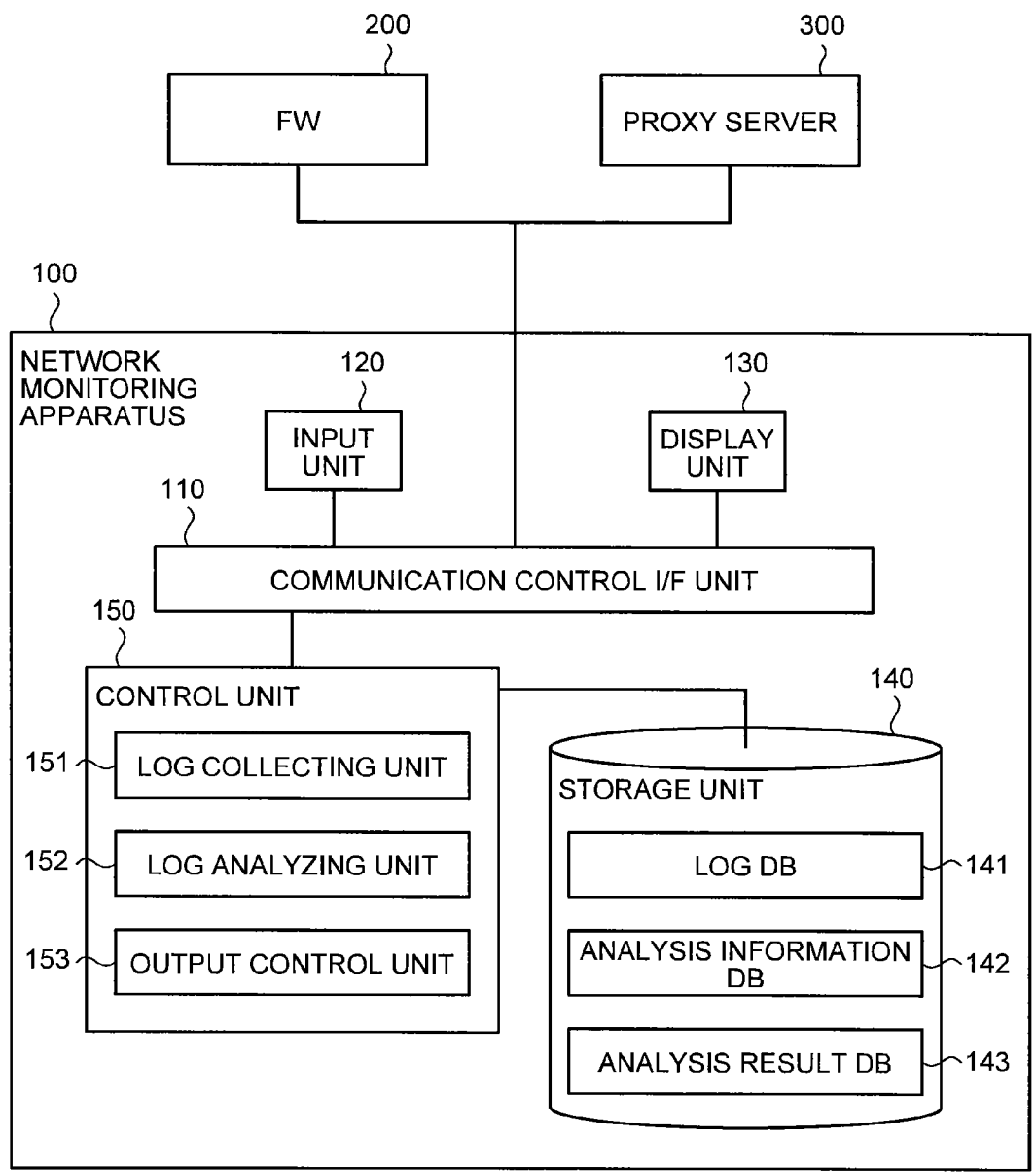
FIG. 2 is a diagram illustrating an example of a configuration of the network monitoring apparatus according to the first embodiment.

Next, a configuration of the network monitoring apparatus according to the first embodiment will be described. FIG. 2 is a diagram illustrating an example of the configuration of the network monitoring apparatus 100 according to the first embodiment. As illustrated in FIG. 2, the network monitoring apparatus 100 is connected to the FW 200 and proxy server 300, and monitors communication in the intra-enterprise NW. In FIG. 2, one each of the FW 200 and proxy server 300 is illustrated, but practically, arbitrary numbers of the FWs 200 and proxy servers 300 are connected to the network monitoring apparatus 100.

The network monitoring apparatus 100 has, as illustrated in FIG. 2, a communication control I/F unit 110, an input unit 120, a display unit 130, a storage unit 140, and a control unit 150. The network monitoring apparatus 100 collects log information from the FW 200 and proxy server 300 included in the intra-enterprise NW and monitors, based on the collected log information, communication in the intra-enterprise NW.

The communication control I/F unit 110 controls communication related to various types of information exchanged between the FW 200 and proxy server 300 included in the intra-enterprise NW and the control unit 150. For example, the communication control I/F unit 110 controls communication related to collection of logs from the FW 200 and proxy server 300. Further, the communication control I/F unit 110 controls exchange of various types of information between: the input unit 120 and display unit 130; and the control unit 150.

The input unit 120 is, for example, a key board, a mouse, and the like, and accepts input processing of various types of information by a user. In one example, the input unit 120 accepts input processing or the like of a condition or the like for analyzing log information. The condition for analyzing log information will be described later. The display unit 130 is, for example, a display or the like, and outputs a result of processing by displaying it to a user. In one example, the display unit 130 outputs log information corresponding to the condition for analyzing log information by displaying it. That is, the display unit 130 outputs log information related to unauthorized communication in the intra-enterprise NW by displaying it.

The storage unit 140 has, as illustrated in FIG. 1, a log DB 141, an analysis information DB 142, and an analysis result DB 143. The storage unit 140 is, for example: a storage device, such as a hard disk or an optical disk; or a semiconductor memory element, such as a Random Access Memory (RAM) or a Flash Memory, and stores various programs and the like executed by the network monitoring apparatus 100.

The log DB 141 stores therein a log or logs collected from at least one of the FW 200 and proxy server 300 by the control unit 150, which will be described later. Specifically, the log DB 141 stores therein log information, which has been collected from at least one of the FW 200 and proxy server 300 by the later described control unit 150 and which has been normalized. For example, the log DB 141 stores therein log information having information that has been normalized, the information including: 5-tuple information (destination IP addresses, source IP addresses, destination ports, source ports, and protocols); connect times of communication; connection results; transmitted and received packet sizes; information on access destination URLs; and time stamps, for packets passing the FW 200 or proxy server 300.

FIG. 3 is a diagram illustrating an example of the log information stored in the log DB 141 according to the first embodiment. For example, the log DB 141 stores therein, as illustrated in FIG. 3, log information, in which pieces of information on respective packets have been arranged chronologically based on the time stamp information. That is, the log DB 141 stores therein, as illustrated in FIG. 3, log information, in which "Date/Time" is associated with destination IP addresses, source IP addresses, destination ports, source ports, protocols, transmitted sizes, received sizes, destination URLs, user agents, request methods, and determination results.

The "Date/Time" illustrated in FIG. 3 indicates a time at which a packet passed the FW 200 or a time at which the proxy server 300 executed communication. Further, "Destination IP Address" illustrated in FIG. 3 indicates an IP address of a terminal at a destination of the packet (the user PC in the intra-enterprise NW, the terminal on the Internet, or the like) or of a server (the file server in the intra-enterprise NW, the server on the Internet, or the like). Furthermore, "Source IP Address" illustrated in FIG. 3 indicates an IP address of a terminal at a transmission source of the packet (the user PC in the intra-enterprise NW, the terminal on the Internet, or the like) or of the server (the file server in the intra-enterprise NW, the server on the Internet, or the like).

Moreover, the "Destination Port" illustrated in FIG. 3 indicates a port of the terminal to be the destination of the packet (the user PC in the intra-enterprise NW, the terminal on the Internet, or the like) or of the server (the file server in the intra-enterprise NW, the server on the Internet, or the like). Further, "Source Port" illustrated in FIG. 3 indicates a port of the terminal to be the transmission source of the packet (the user PC in the intra-enterprise NW, the terminal on the Internet, or the like) or of the server (the file server in the intra-enterprise NW, the server on the Internet, or the like). Furthermore, "Protocol" illustrated in FIG. 3 indicates a communication protocol used in transmission and reception of the packet.

Moreover, "Transmitted Size" illustrated in FIG. 3 indicates a size of the packet transmitted by the FW 200 or proxy server 300. Further, "Received Size" illustrated in FIG. 3 indicates a size of the packet received by the FW 200 or proxy server 300. Further, "Destination URL" illustrated in FIG. 3 indicates a URL of a site on the server (the file server in the intra-enterprise NW, the server on the Internet, or the like) accessed by the terminal (the user PC in the intra-enterprise NW, the terminal on the Internet, or the like).

Furthermore, "User Agent" illustrated in FIG. 3 indicates information on a browser of the terminal (the user PC in the intra-enterprise NW, the terminal on the Internet, or the like) that accesses the site on the server (the file server in the intra-enterprise NW, the server on the Internet, or the like). For example, if a user requests browsing of a Web site, a series of headers are transmitted from a browser to a server hosting that site. The respective headers include detailed information for the server to determine an optimum method of providing the information requested to be browsed. This "User Agent" is the header for identifying an application requesting information to the server. For example, "User Agent" includes information on a browser of the terminal that has requested browsing of the Web site, a version of the browser, an OS, and the like.

Further, "Request Method" illustrated in FIG. 3 indicates a request transmitted from the terminal (the user PC in the intra-enterprise NW, the terminal on the Internet, or the like) to the server (the file server in the intra-enterprise NW, the server on the Internet, or the like). Examples of "Request Method" include: "GET" by which a browser requests a server to obtain a Web site; "HEAD" requesting only header information; "PUT" and "POST" requesting a server to upload a file.

Further, "Determination Result" illustrated in FIG. 3 indicates a result of determination by the FW 200 or proxy server 300. For example, "Determination Result" includes a result of transfer control of a packet between a user PC and the Internet based on a condition predefined by a user. Further, "Determination Result" includes, for example, a result of connection restrictions on: a Web site of a connection destination on the Internet based on a destination URL or the like of the packet; and the user terminal of the connection source.

As described above, the log DB 141 stores therein the log information, which is collected by the later described control unit 150 and is as illustrated in FIG. 3. The log information illustrated in FIG. 3 is just an example, and the embodiment is not to be limited thereto. That is, the log DB 141 is able to store therein other types of information as the log information. Further, not all of the information illustrated in FIG. 3 is collected for all of the packets, and for example, logs depending on log output devices that output the logs are collected. In other words, depending on types of the log output devices, any of the information may not be collected.

Returning to FIG. 2, the analysis information DB 142 stores therein information used in analysis by the later described control unit 150. Specifically, the analysis information DB 142 stores therein various types of information for extracting log information satisfying a predetermined condition, from the log information stored in the log DB 141. For example, the analysis information DB 142 stores therein information that becomes a key when log information is extracted with information included in a header of a packet. In one example, the analysis information DB 142 stores therein information that becomes a key when log information is extracted with a character string included in a user agent. For example, the analysis information DB 142 stores therein a predetermined character string for extracting log information in which a character string other than the predetermined character string is included in the user agent. The above described examples are just an example, and the information stored in the analysis information DB 142 is not limited thereto. That is, the analysis information DB 142 may store therein any information as long as the information is able to be used when log information satisfying a predetermined condition is extracted from the log information stored in the log DB 141.

The analysis result DB 143 stores therein a result of analysis by the later described control unit 150. Specifically, the analysis result DB 143 stores therein log information extracted, based on a predetermined condition, by the later described control unit 150, from the log information stored in the log DB 141. More specifically, the analysis result DB 143 stores therein log information satisfying a predetermined condition in a predetermined time period, the log information having been extracted by the log information stored in the log DB 141 being analyzed over time.

The control unit 150 has a log collecting unit 151, a log analyzing unit 152, and an output control unit 153. The control unit 150 is, for example: an electronic circuit, such as a Central Processing Unit (CPU) or a Micro Processing Unit (MPU); or an integrated circuit, such as an Application Specific Integrated Circuit (ASIC) or a Field Programmable Gate Array (FPGA), and executes overall control of the network monitoring apparatus 100.

The log collecting unit 151 collects, for packets transferred in the intra-enterprise NW, a log or logs related to passing packets from at least one of the FW 200 and proxy server 300 included in the intra-enterprise NW. Specifically, the log collecting unit 151 collects 5-tuple information of packets from the FW 200 and information on passing times of the packets (time stamps of the passage of the packets), in addition to information on determination results with respect to the packets (whether or not they are of unauthorized communication) and the like. Further, the log collecting unit 151 stores: information on connect times of communication from the proxy server 300, connection source user terminals, connection results, transmitted and received sizes of packets, access methods, and access destination URLs; information on times at which the communication was performed (time stamps of the execution of the communication); and the like.

By normalizing the collected information, the log collecting unit 151 converts log files of different formats into log information of a unified common format. The log collecting unit 151 stores the normalized log information into the log DB 141. For example, the log collecting unit 151 stores log information resulting from normalization of the above described log information, into the log DB 141 (see FIG. 3). That is, the log collecting unit 151 stores, as the log information, into the log DB 141, log information including: destination IP addresses, source IP addresses, destination ports, source ports, protocols, transmitted and received packet sizes, packet destination URLs, user agents, request methods, results of determination by the FW 200 or proxy server 300; and time information, for the packets transferred in the intra-enterprise NW.

The log collecting unit 151 may select the log information to be collected according to a condition of log information analysis by the later described log analyzing unit 152. For example, the log collecting unit 151 collects a log including a destination IP address, a source IP address, a destination port, a source port, a protocol, and time information (a time stamp), for a packet transferred in a network. Or, the log collecting unit 151 collects information including a destination IP address, a source IP address, a destination port, a source port, a protocol, transmitted and received packet sizes, and time information (a time stamp), for a packet transferred in the network. Or, the log collecting unit 151 collects, as the log information, information including a destination IP address, a source IP address, a destination port, a source port, a protocol, a packet destination URL, a user agent, a request method, and time information (a time stamp), for a packet transferred in the network. That is, by the selection of the log information to be collected, a configuration of the log information stored in the log DB 141 by the log collecting unit 151 is changed as appropriate.

The log analyzing unit 152 extracts, by analyzing, over time, the log information collected by the log collecting unit 151, log information satisfying a predetermined condition in a predetermined time period. Specifically, the log analyzing unit 152 extracts, based on the log information collected by the log collecting unit 151, log information with a connection count and intervals of communication in a predetermined time period satisfying a predetermined condition. For example, by using the destination IP addresses, the source IP addresses, the destination ports, the source ports, the protocols, and the time information of the log information collected by the log collecting unit 151, the log analyzing unit 152 extracts, from the log information stored in the log DB 141, log information of communication with a connection count of "10 times" and continuously occurring at "30-second" time intervals for a predetermined time period. The log analyzing unit 152 then stores the extracted log information into the analysis result DB 143.

Further, the log analyzing unit 152 extracts, based on the log information collected by the log collecting unit 151, log information with transmitted and received sizes of packets in a predetermined time period satisfying the predetermined condition. For example, by using the destination IP addresses, the source IP addresses, the destination ports, the source ports, the protocols, the transmitted and received packet sizes, and the time information, which are of the log information collected by the log collecting unit 151, the log analyzing unit 152 extracts, from the log information stored in the log DB 141, log information of communication with transmitted and received packets sizes respectively greater than predetermined numbers of bytes and continuing for a predetermined time period. The log analyzing unit 152 stores the extracted log information into the analysis result DB 143.

Further, the log analyzing unit 152 extracts, based on the log information collected by the log collecting unit 151, log information with header information of original communication included in logs in a predetermined time period satisfying a predetermined condition. For example, by using the destination IP addresses, the source IP addresses, the destination ports, the source ports, the protocols, the packet destination URLs, the user agents, the request methods, and the time information, which are of the log information collected by the log collecting unit 151, the log analyzing unit 152 extracts log information of communication with a character string included in the user agents being a character string not stored in the analysis information DB 142, the communication continuing for a predetermined time period. The log analyzing unit 152 then stores the extracted log information into the analysis result DB 143.

As described above, by analyzing, over time, the log information collected by the log collecting unit 151, the log analyzing unit 152 extracts log information satisfying a predetermined condition in a predetermined time period. The above described examples of extraction are just an example, and a condition for extracting the log information may be arbitrarily set by a user. For example, various conditions may be set for a plurality of pieces of information (for example, the respective pieces of information illustrated in FIG. 3) and log information of communication satisfying the set conditions and continuing for a predetermined time period may be extracted. Setting of these conditions may be input by a user via the input unit 120 when the log information is analyzed, or preset conditions may be read out by the log analyzing unit 152. By a user causing analysis to be performed by setting various conditions analogized to unauthorized communication, log information likely to be of unauthorized communication is able to be detected.

The output control unit 153 controls an analysis result, which has been analyzed by the log analyzing unit 152 and stored in the analysis result DB 143, to be output by being displayed on the display unit 130. That is, the output control unit 153 causes the log information extracted with the condition set by the user to be output by being displayed. Therefore, by setting various conditions analogized to unauthorized communication, a user is able to check on the display unit 130 information likely to be of unauthorized communication.

[Sequence of Processing by Network Monitoring Apparatus According to First Embodiment]

Figure 4:
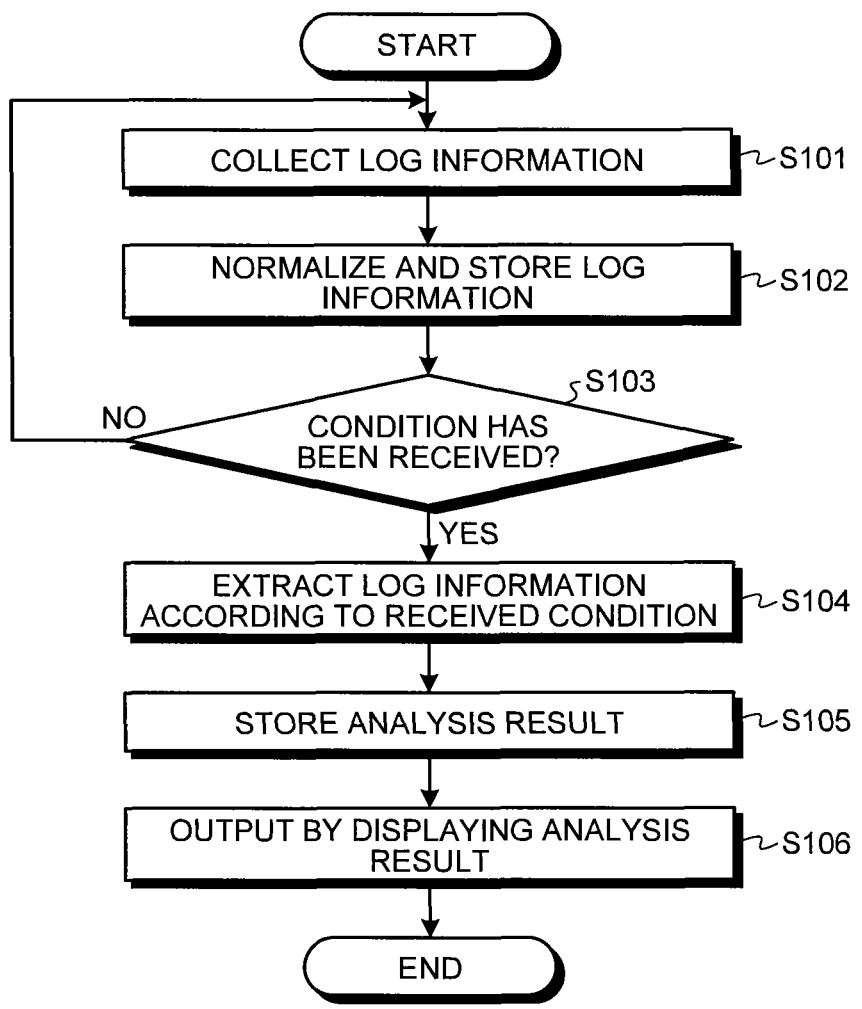
FIG. 4 is a flow chart illustrating a sequence of processing by the network monitoring apparatus according to the first embodiment.

Next, a sequence of processing by the network monitoring apparatus 100 according to the first embodiment will be described by using FIG. 4. FIG. 4 is a flow chart illustrating the sequence of the processing by the network monitoring apparatus 100 according to the first embodiment. As illustrated in FIG. 4, in the network monitoring apparatus 100 according to the first embodiment, the log collecting unit 151 collects log information from the FW 200 and proxy server 300 (Step S101), and normalizes and stores into the log DB 141, the collected log information (Step S102).

When the input unit 120 receives a condition of analysis from an operator (Step S103: Yes), the log analyzing unit 152 extracts log information according to the received condition of analysis (Step S104). Thereafter, the log analyzing unit 152 stores an analysis result, which is the extracted log information, into the analysis result DB 143 (Step S105). Until the log analyzing unit 152 receives a condition of analysis, the collection of log information continues to be executed (Step S103: No).

The output control unit 153 then outputs the analysis result stored in the analysis result DB 143 by display on the display unit 130 (Step S106).

[Effects of First Embodiment]

As described above, according to the first embodiment, the log collecting unit 151 collects log information from at least one of the FW 200 and proxy server 300 included in the intra-enterprise NW, for packets transferred in the enterprise network. The log analyzing unit 152 then extracts log information satisfying a predetermined condition in a predetermined time period by analyzing, over time, the log information collected by the log collecting unit 151. Therefore, by extracting log information based on change over time of log information satisfying a predetermined condition, the network monitoring apparatus 100 according to the first embodiment is able to detect a candidate for unauthorized communication that used to be overlooked before, and enables unauthorized communication to be efficiently identified.

For example, a FW of the conventional art determines possibility of passage packet by packet, and thus by just singly looking at logs for passed packets upon success of an attack, communication of an attacker is unable to be recognized, and response to unknown attacks that continue to evolve has sometimes been delayed. Further, for example, since an IDS/IPS of the signature type of the conventional art is based on predefined patterns, response to unknown attacks has sometimes been delayed, too. In contrast, by performing analysis over time on log information satisfying a predetermined condition, the network monitoring apparatus 100 according to this application is able to detect attacks and the like which used to be not detectable before, and enables unauthorized communication to be efficiently identified.

Further, for example, the network monitoring apparatus 100 according to this application is able to detect diverse unauthorized communication by flexibly changing the predetermined condition related to the plurality of pieces of log information stored in the FW 200 and proxy server 300.

Further, according to the first embodiment, the log collecting unit 151 collects, as the log information, information including destination IP addresses, source IP addresses, destination ports, source ports, protocols, and time stamps, for packets transferred in the intra-enterprise NW. The log analyzing unit 152 then extracts, based on the log information collected by the log collecting unit 151, log information of communication with a connection count and intervals thereof in a predetermined time period satisfying a predetermined condition. Therefore, the network monitoring apparatus 100 according to the first embodiment is able to detect unauthorized communication, such as communication continuously executed with a malicious site, and take-out of data by an attacker on the Internet, for example.

Further, according to the first embodiment, the log collecting unit 151 collects, as log information, information including destination IP addresses, source IP addresses, destination ports, source ports, protocols, transmitted and received packet sizes, and time stamps, for packets transferred in a network. Further, the log analyzing unit 152 extracts, based on the log information collected by the log collecting unit 151, log information with transmitted and received packet sizes satisfying a predetermined condition in a predetermined time period. Therefore, the network monitoring apparatus 100 according to the first embodiment is able to detect unauthorized communication, such as an attack to a file server in the intra-enterprise NW from an attacker on the Internet, for example.

Further, according to the first embodiment, the log collecting unit 151 collects, as log information, information including destination IP addresses, source IP addresses, destination ports, source ports, protocols, packet destination URLs, user agents, request methods, and time stamps, for packets transferred in the intra-enterprise NW. The log analyzing unit 152 extracts, based on the log information collected by the log collecting unit 151, log information with header information of original communication included in logs in a predetermined time period satisfying a predetermined condition. Therefore, the network monitoring apparatus 100 according to the first embodiment is able to detect unauthorized communication including illegal HTTP header information, for example.

Second Embodiment

Next, a detecting apparatus (corresponding to the network monitoring apparatus according to the first embodiment) according to a second embodiment will be described. The detecting apparatus according to the second embodiment is able to detect cyber attacks, which are difficult to be detected under the present circumstances, and to detect phenomena, such as communication with an attacker and information leakage after success of an attack.

Conventionally, it has been very general to connect an internal network, such as an intra-enterprise network, to an external network, such as the Internet, and to use various services run on the external network. Cyber attacks to various services provided via a network and infrastructure (social infrastructure) are evolving day after day to those that use diverse techniques and that are persistent, and their threat is increasing more and more.

An example of their threat is falsely accessing a server provided in an internal network from an external network and stealing confidential information. Another example is, not just simply accessing an internal network falsely from an external network, but also falsely embedding malicious software in a personal computer (PC) connected to the internal network, that is, causing the PC to be infected with the malicious software, and collecting falsely and transmitting to outside information from a server in the internal network by using the infected software. Further, yet another example is disturbing normal operation of a server in an internal network by sending malicious packets from an external network to the internal network.

In order to defend an internal network against such threat, in addition to provision of a FireWall (FW) at a connection point between an external network and the internal network, an IDS/IPS is starting to be provided. The IDS/IPS is a system that detects phenomena suspected to be of hacking from outside, and executes necessary defensive measures, such as disconnection of communication, if such phenomena are detected.

Figure 5:
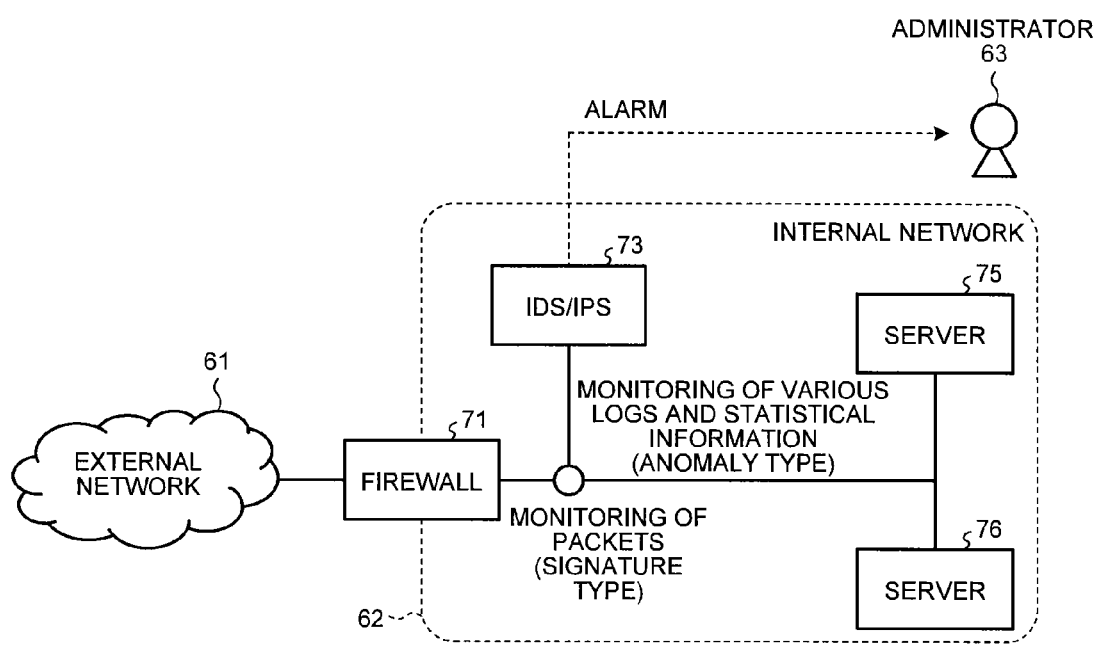
FIG. 5 is a diagram illustrating an example of a configuration of a system for detecting and defending against unauthorized access and hacking.

FIG. 5 is a diagram illustrating an example of a configuration of a system for detecting and defending against unauthorized access and hacking. An internal network 62 is connected to an external network 61. Both of these networks transfer IP packets, and as a protocol of an IP upper layer, Transmission Control Protocol (TCP) or User Datagram Protocol (UDP) is used.

Between the external network 61 and internal network 62, a FireWall 71 for preventing unauthorized communication by performing packet filtering is provided. The FireWall 71 executes, based on so-called 5-tuples included in packet headers, processing of packet filtering. The 5-tuple is a combination of five parameters, consisting of a source IP address, a destination IP address, and a protocol, which are included in a header of an IP packet, and a transmission source port number and a destination port number, which are included in a header of a TCP packet or UDP packet. The FireWall 71 has a logging function and is able to provide, to an administrator, logs related to possibility of passage for packets, which attempted to pass therethrough.

In the internal network 62, servers 75 and 76 are provided for example, and an IDS/IPS 73, which is for detecting and defending against cyber attacks, such as unauthorized access and hacking, that have not been able to be stopped by the FireWall 71, is also provided. The IDS/IPS 73 sends an alarm to a network administrator 63, if unauthorized access, hacking, or the like is detected.

Detecting methods used for the IDS/IPS 73 in detecting unauthorized access and hacking are broadly classified into a signature type and an anomaly type. By a detecting method of the signature type, assuming that a bit string characterizing unauthorized access, hacking, or the like is known, packets passing a certain point in a network are examined, and if an illegal bit string is present therein, abnormality is detected. By the anomaly type: a normal state is defined with respect to a resource load, an amount of communication, user behaviors, and the like; various logs, statistical information, amounts of load, amounts of communication, and the like are monitored; and if a state of a network or a server connected thereto deviates from the normal state, abnormality is detected. The signature type is based on matching with a predefined pattern and is premised on the fact that the illegal bit string is known, and thus has a problem that response thereof to an unknown attack tends to be delayed. For the anomaly type, erroneous detection becomes frequent if the normal state is defined too strictly, and thus it has a problem that it is difficult to find unauthorized communication thoroughly.

Techniques of cyber attacks are evolving and becoming diverse, and just with the technique of making the determination by looking at the logs from a FireWall or defending by the matching with signatures and pattern files with use of an IDS/IPS or the like, it is difficult to deal with the continuously evolving cyber attacks. Therefore, defense with a security appliance, such as a conventional FireWall or IDS/IPS, is not sufficient and a new technique for detecting cyber attacks without omission is necessary. Further, although a security appliance is also present, which detects abnormality when a traffic flow amount exceeds a threshold value or when deviation from a predefined pattern occurs, there is a problem that continuous communication between an infected terminal (a terminal in which malicious software has been embedded) on an internal network and an attacker on an external network side is not able to be detected.

Thus, the detecting apparatus according to the second embodiment solves the above described problems by detecting cyber attacks, which have evolved as described above and are difficult to be detected under the present circumstances, and detecting phenomena, such as communication with an attacker and information leakage after success of an attack.

Figure 6:
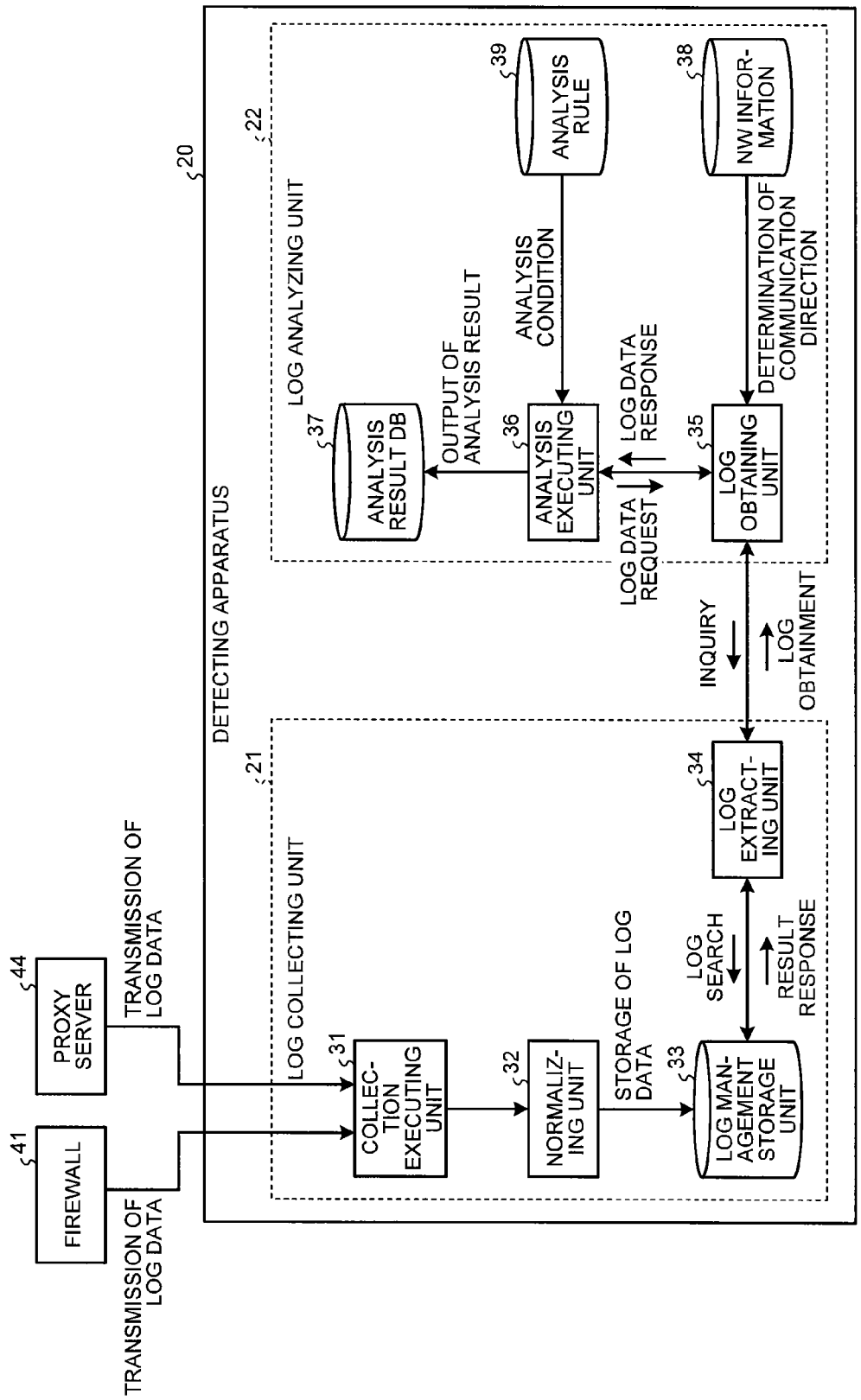
FIG. 6 is a block diagram illustrating a configuration of a detecting apparatus according to a second embodiment.

Next, the detecting apparatus according to the second embodiment will be described with reference to the drawings. FIG. 6 is a block diagram illustrating a configuration of the detecting apparatus according to the second embodiment.

A detecting apparatus 20 illustrated in FIG. 6 is provided in an internal network where IP packets are transferred. The internal network is connected to the Internet, which is an external network, via a FireWall 41, and a proxy server 44 for Web access is provided in the internal network. The proxy server 44 represents access to Web sites on the Internet from a terminal in the internal network and performs access restriction as necessary, and in particular, performs proxy response to and transfer control on messages, by Hypertext Transmission Protocol (http) or http secure (https). The detecting apparatus 20 according to the second embodiment is provided separately from a conventional security appliance, such as an IDS/IPS. The detecting apparatus 20 performs correlation analysis focused on a log time series by using logs from the FireWall 41 and proxy server 44, and extracts a false pattern from a result of that analysis, to thereby detect occurrence of a cyber attack or information leakage. The correlation analysis focused on the time series is preferably performed over a long time period. The detecting apparatus 20 uses, from the logs obtained from the FireWall 41 and proxy server 44, in particular, 5-tuples, transmitted sizes, received sizes, destination URLs, User-Agent, request methods, and time stamps. The transmitted sizes and received sizes are able to be obtained both from the log of the FireWall 41 and from http headers. The destination URLs, the User-Agent, and the request methods, are all obtained from the http headers or https headers. The time stamps are time information related to records of the logs in the devices, such as the FireWall 41 and proxy server 44, and indicate a time at which an event corresponding to a log occurred or a time at which a log was actually recorded, for example.

Roughly separating, this detecting apparatus 20 is, as illustrated in FIG. 6, formed of: a log collecting unit 21, which collects and stores log data from the FireWall 41 and proxy server 44; and a log analyzing unit 22, which performs analysis on the log data stored by the log collecting unit 21.

The log collecting unit 21 includes: a collection executing unit 31, which collects the log data from the FireWall 41 and proxy server 44; a normalizing unit 32, which performs normalization of the log data to facilitate analysis; a log management storage unit 33, in which the normalized log data are stored; and a log extracting unit 34, which searches the log data in the log management storage unit 33 according to inquiry from the log analyzing unit 22, receives a response of a result of the search from the log management storage unit 33, and transfers it to the log analyzing unit 22. The log data collected by the collection executing unit 31 include, for example, in addition to 5-tuple information, which is destination IP addresses, source IP addresses, destination ports, source ports, and protocols; information on transmitted sizes, received sizes, destination URLs, User-Agent, request methods, and time stamps. Furthermore, the log data may include results of determination (called device determination results) of whether targeted packets or http messages have been passed or rejected as unauthorized in the FireWall 41 and proxy server 44, or information, such as a device ID of each of the FireWall 41 and proxy server 44. If formats of the log data output from the FireWall 41 and proxy server 44 are unified or the like, analysis is able to be performed easily without necessarily performing normalization processing, and thus the log data collected by the collection executing unit 31 may be directly stored in the log management storage unit 33 without the normalizing unit 32 being provided.

The log analyzing unit 22 includes: a log obtaining unit 35, which obtains logs by making inquiry to the log extracting unit 34 of the log collecting unit 21; an analysis executing unit 36, which requests log data to the log obtaining unit 35, receives a response thereto, and performs analysis of the log data according to a set analysis condition; and an analysis result database (DB) 37, which stores therein results of the analysis output from the analysis executing unit 36. Further, in order to achieve flexible analysis and improvement in accuracy of the analysis, the log analyzing unit 22 may include: a storage unit 38 (referred to as "NW information 38" as appropriate), which stores therein network (NW) information; and a storage unit 39 (referred to as "analysis rule 39" as appropriate), which stores therein various analysis rules as analysis conditions. The network information is information on topology, an address, subnets, and the like of a network to be monitored, and is used in order to determine, when the log obtaining unit 35 obtains log data from the log collecting unit 21, which direction a direction of communication related to the log data is (whether it is communication directed from the internal network to the external network, in a direction opposite thereto, or communication closed within the internal network). The determined communication direction is transmitted, together with the log data, to the analysis executing unit 36.

In the detecting apparatus 20, the analysis executing unit 36 may be configured to be able to read, from the storage unit 39, a plurality of analysis rules for analyzing time-based correlation for a plurality of sets of log data, rather than a single set of log data. If a plurality of analysis rules are to be read, the analysis executing unit 36 uses, for the analysis, values of items determined by the respective analysis rules, from the log data accumulated in the log collecting unit 21, and outputs a result of the analysis for each analysis rule. Furthermore, the analysis executing unit 36 identifies a candidate for unauthorized communication and outputs that candidate, from a combination pattern of the results of the analysis by the respective analysis rules.

Next, operations of this detecting apparatus 20 will be described.

Log data are transmitted at any time from the FireWall 41 and proxy server 44 in the internal network, the collection executing unit 31 collects these log data and transfers them to the normalizing unit 32 in the log collecting unit 21, and the normalizing unit 32 normalizes the log data and stores the normalized log data into the log management storage unit 33. In the log analyzing unit 22, the analysis executing unit 36 transmits a log data request to the log obtaining unit 35, the log obtaining unit 35 makes inquiry, based on the log data request, to the log extracting unit 34 in the log collecting unit 21, and the log extracting unit 34 searches, based on the inquiry, the log data in the log management storage unit 33. A result response for this search is transmitted from the log management storage unit 33 to the log extracting unit 34, and thereby, the log obtaining unit 35 obtains the log data from the log extracting unit 34. Next, the log obtaining unit 35 determines, based on the network information in the NW information 38, a communication direction of communication related to the obtained log data, and transmits the log data and a result of the determination of the communication direction, as a log data response, to the analysis executing unit 36. The analysis executing unit 36 then applies a single analysis rule or a plurality of analysis rules read out from the analysis rule 39 to the log data, and extracts a candidate of unauthorized communication by time-based correlation analysis. In particular, if a plurality of analysis rules are applied, the analysis executing unit 36 detects unauthorized communication more accurately by analyzing an output frequency and a pattern of analysis results obtained by the plurality of analysis rules. The extracted candidate for unauthorized communication is accumulated in the analysis result DB 37.

In many internal networks within enterprises, protocols and port numbers of packets that are able to pass through FireWalls are restricted. Representative examples of few passable protocols/port numbers are http messages for Web access. Therefore, if an attacker intends to infect a terminal on an internal network with malicious software and steal data in the terminal or a server on the internal network by using that software, the attacker is likely to use http messages. The detecting apparatus 20 according to the second embodiment is able to detect http communication suspected to be unauthorized, by using, in addition to log data from the FireWall 41, log data from the proxy server 44 for Web access, and in particular, is able to detect communication between an infected terminal and an attacker and communication with the possibility of information leakage.

Since the detecting apparatus 20 according to the second embodiment is able to use those output from an existing device as the log data themselves to be used, the detecting apparatus 20 is able to be introduced into a network configuration without placing much influence thereon.

Hereinafter, examples of analysis rules, which are able to be used in the detecting apparatus 20 according to the second embodiment, in particular, analysis rules, which are able to be used for detecting communication between an infected terminal and an attacker and communication with the possibility of information leakage, and which enable analysis of time-based correlation for log data, will be described.

(1) Noting the numbers of transmitted bytes of http connection, based on at least 5-tuple information and information on the numbers of transmitted bytes and time stamps, from the log data accumulated in the log collecting unit 21, by referring to time information of the time stamps, communication with a value of the number of transmitted bytes within a set time period, the value having a difference from a normal value, is regarded as communication suspected to be unauthorized.

(2) Noting the number of http connections, based on at least 5-tuple information and information on destination URLs and time stamps, from the log data accumulated in the log collecting unit 21, by referring to time information of the time stamps, communication with a connection count of a group of the same communication in a set time period, the connection count having a difference from a normal value, is regarded as communication suspected to be unauthorized.

(3) Noting connection that violates policy, assuming the policy has been set beforehand in an internal network, based on at least 5-tuple information, the above described device determination results, and information on time stamps, from the log data accumulated in the log collecting unit 21, by referring to time information of the time stamps, communication with an occurrence frequency of policy violation in connections of a group of the same communication in a set time period, the occurrence frequency having a difference from a normal value, is regarded as communication suspected to be unauthorized.

(4) Noting a difference between the numbers of transmitted and received bytes of http connection, based on at least 5-tuple information and information on the numbers of transmitted bytes, the numbers of received bytes, and time stamps, from the log data accumulated in the log collecting unit 21, by referring to time information of the time stamps, communication with a value of a difference between the number of transmitted bytes and the number of received bytes in a set time period, the value having a difference from a normal value, is regarded as communication suspected to be unauthorized.

(5) Noting User-Agent from header information of http communication, based on at least 5-tuple information and information on User-Agent and time stamps, from the log data accumulated in the log collecting unit 21, by referring to time information of the time stamps, communication with a User-Agent in a set time period, the User-Agent being different from a normal value, is regarded as communication suspected to be unauthorized.

(6) Noting request methods and the numbers of transmitted and received bytes, from header information of http communication, based on at least 5-tuple information and information on the numbers of transmitted bytes, the numbers of received bytes, request methods, and time stamps, from the log data accumulated in the log collecting unit 21, by referring to time information of the time stamps, communication with a particular request method and a value of a difference between the numbers of transmitted and received bytes associated with that communication, the particular request method and the value being different from normal values, is regarded as communication suspected to be unauthorized.

(7) Noting destination URLs, based on 5-tuple information and information on destination URLs and time stamps, from the log data accumulated in the log collecting unit 21, by referring to time information of the time stamps, communication having abnormality in destination URLs in a set time period is regarded as communication suspected to be unauthorized.

For example, the detecting apparatus 20 according to the second embodiment may be configured as dedicated hardware, but may also be realized by using a general-purpose computer including a micro processor, a memory, and a communication interface and executing a computer program that executes functions of the detecting apparatus 20 on this computer. The same applies to the network monitoring apparatus 100 according to the first embodiment.

Figure 7:
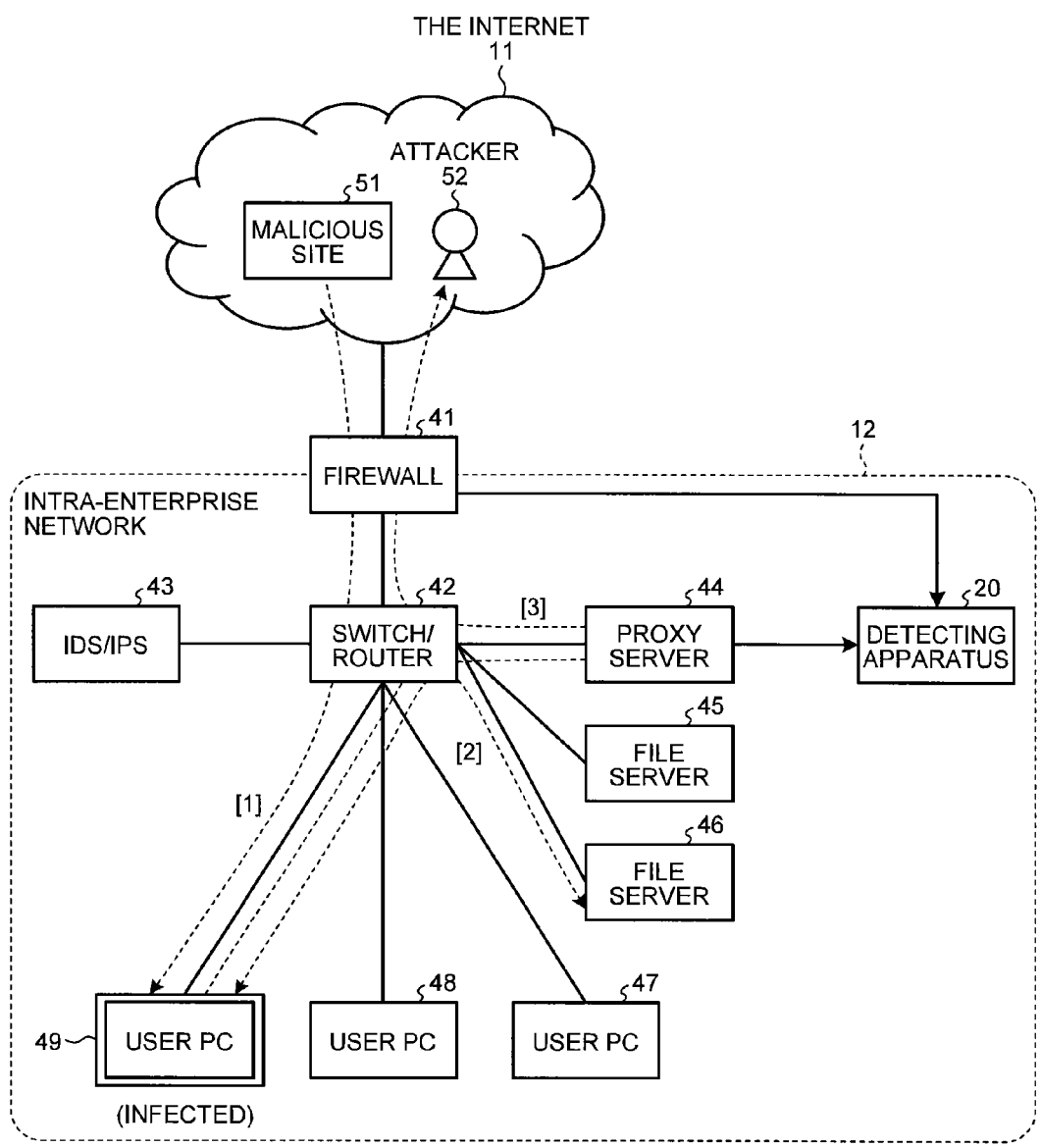
FIG. 7 is a diagram illustrating an example of a configuration of a network, to which the detecting apparatus according to the second embodiment is applied.
Figure 8:
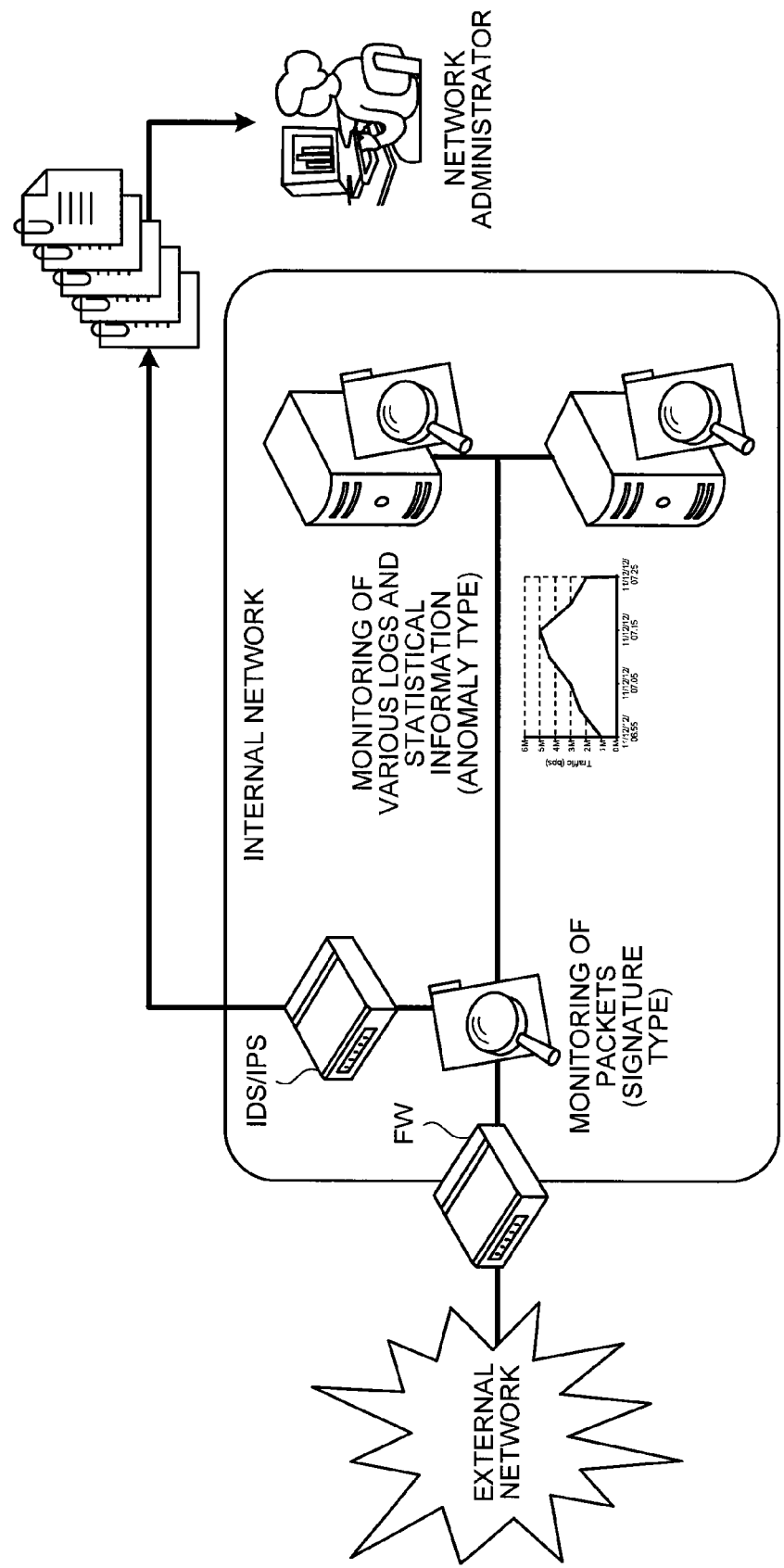
FIG. 8 is a diagram illustrating an example of a countermeasure technique according to conventional art.

FIG. 7 is a diagram illustrating an example of a configuration of a network, to which the detecting apparatus according to the second embodiment is applied. An intra-enterprise network 12, which is an internal network, is connected to the Internet 11, and the FireWall 41 is provided at a connection point between the intra-enterprise network 12 and the Internet 11. In the intra-enterprise network 12, a switch (SW)/router 42, which connects to the FireWall 41, is provided; and to the switch/router 42: an IDS/IPS 43; the proxy server 44; file servers 45 and 46; and user PCs 47 to 49, which are terminals, are provided. The above described detecting apparatus 20 is provided to receive log data from the FireWall 41 and proxy server 44. Although not illustrated in the drawings, in the intra-enterprise network 12, the network may be further divided into several segments, and an internal FireWall may be provided at a segment dividing point. If log data of the internal FireWall are also provided to the detecting apparatus 20, communication suspected to be unauthorized, which has a start/end point in the intra-enterprise network 12, is able to be detected.

The Internet 11 is assumed to have a malicious site 51 present therein and to have an attacker 52 also present therein. Of the user PCs 47 to 49, the user PC 49 illustrated with a double lined frame is assumed to be an infected terminal embedded with malicious software. If an attacker attempts to steal information from the intra-enterprise network 12, in a typical example: first, as illustrated with "[1]", the user PC 49 performs communication with the malicious site 51 and is instructed to investigate the file servers 45 and 46; next, as illustrated with "[2]", the user PC 49 performs investigation activity inside and obtains information from the file servers 45 and 46; and lastly, as illustrated with "[3]", by the user PC 49, which is the infected terminal, performing communication with the attacker 52 and transmitting the illegally obtained data to the attacker 52, the data are taken out to the Internet 11 side. By using the detecting apparatus 20 according to the second embodiment and applying the above described analysis rules, at any of the stages illustrated with "[1]", "[2]", and "[3]" in the figure, based on log data from at least one of the FireWall 41 and internal FireWall and on log data from the proxy server 44, communication suspected to be unauthorized is able to be detected.

As described above, the detecting apparatus according to the second embodiment achieves an effect of being able to detect communication suspected to be unauthorized, in particular, of being able to detect phenomena, such as communication with an attacker and information leakage after success of an attack, by using log data from devices generally provided in an existing network, the devices being a FireWall and a proxy server, and combining these log data.

Third Embodiment

The first embodiment and second embodiment have been described above, but embodiments according to the present application are not limited to the first embodiment and second embodiment. That is, these embodiments may be implemented in various other modes, and various omissions therefrom, replacements therewith, and modifications thereof may be made.

For example, specific modes (for example, the mode in FIG. 2) of separation and integration of the respective devices are not limited only to those illustrated in the drawings, and all or a part thereof may be functionally or physically separated or integrated in arbitrary units depending on various loads and use situations. For example, the log DB 141 and the analysis result DB 143 may be integrated into one DB, and the log collecting unit 151 may be separated into a collecting unit that collects logs and a normalization processing unit that performs normalization processing. Further, the storage unit 140 may use a DB of an existing management system or an external DB. That is, a DB of an existing management system or an external DB may have the log DB 141, analysis information DB 142, and analysis result DB 143 included in the storage unit 140, and the control unit 150 may access the DB of the existing management system or external DB to execute reading and writing of information.

Further, the control unit 150 may be connected, as an external device of the network monitoring apparatus 100, via a network, or by respectively including the log collecting unit 151 and the log analyzing unit 152 in separate devices and connecting these to a network for cooperation with each other, the above described functions of the network monitoring apparatus 100 may be realized.

In the above described first embodiment, the case where packets are exchanged between the Internet and the intra-enterprise NW, has been described as one example. However, the embodiments are not limited thereto, and may be applied to any environment as long as it is an environment where packets are exchanged among a plurality of networks, for example.

In the above described first embodiment, as illustrated in FIG. 1, a case where two FWs 200 and one proxy server 300 are included in the intra-enterprise NW has been described. However, the embodiments are not limited thereto, and the number of each device is modified arbitrarily according to networks. That is, the network monitoring apparatus 100 collects log information from each of any FWs 200 and proxy servers 300 arranged in a network to be monitored.

In the above described first embodiment, a case where log information is collected from each of the FW 200 and proxy server 300 has been described. However, the embodiments are not limited thereto, and log information may be collected from any one thereof, for example.

Like these embodiments and modifications thereof are included in the techniques disclosed by the present application, they are included in the invention stated in the patent claims and scope equivalent thereto.

REFERENCE SIGNS LIST

11 INTERNET
12 INTRA-ENTERPRISE NETWORK
20 DETECTING APPARATUS
21, 151 LOG COLLECTING UNIT
22, 152 LOG ANALYZING UNIT
31 COLLECTION EXECUTING UNIT
32 NORMALIZING UNIT
33 LOG MANAGEMENT STORAGE UNIT
34 LOG EXTRACTING UNIT
35 LOG OBTAINING UNIT
36 ANALYSIS EXECUTING UNIT
37, 143 ANALYSIS RESULT DATABASE (DB)
38 STORAGE UNIT STORING NETWORK (NW) INFORMATION
39 STORAGE UNIT STORING ANALYSIS RULE
41, 200 FIREWALL (FW)
42 SWITCH/ROUTER
43 IDS/IPS
44, 300 PROXY SERVER
45, 46 FILE SERVER
47 TO 49 USER PC
100 NETWORK MONITORING APPARATUS
141 LOG DB
142 ANALYSIS INFORMATION DB
153 OUTPUT CONTROL UNIT

The invention claimed is:

1. A network monitoring apparatus, which is provided in a network that includes a FireWall provided on at least one of a connection point with an external network and an internal segment dividing point and a proxy server for Web access and that transfers IP packets, and which detects communication suspected to be unauthorized, the network monitoring apparatus comprising:
  processing circuitry configured to implement
    a log collecting unit that collects and stores log data from at least one of the FireWall and the proxy server; and
    a log analyzing unit that
      makes inquiry for log data to the log collecting unit,
      extracts, based on the log data collected by the log collecting unit, the log data which are in a predetermined time period satisfying a set analysis condition,
      analyzes, according to the set analysis condition, the log data, and
      outputs a candidate for unauthorized communication as a result of the analysis, wherein
    the log data stored by the log collecting unit are information including at least one of: 5-tuples; transmitted sizes; received sizes; information extracted from http headers; and time stamps, and
    the information extracted from http headers includes at least one of: destination URLs; User-Agent; and request methods.

2. The network monitoring apparatus according to claim 1, wherein the log analyzing unit is able to set a plurality of analysis conditions for analyzing time-based correlation with respect to a plurality of sets of the log data, and executes analysis according to each analysis condition.

3. The network monitoring apparatus according to claim 2, wherein the log analyzing unit detects and outputs, from a combination pattern of results of the analysis with the respective analysis conditions, the candidate for unauthorized communication.

4. The network monitoring apparatus according to claim 1, wherein the log analyzing unit determines, based on information on a network to be monitored, a direction of communication to be a target of log data, and executes analysis based on the determined direction and the log data.

5. The network monitoring apparatus according to claim 3, wherein
  the log collecting unit collects, as the log data, information including the 5-tuples and the time stamps, and
  the log analyzing unit extracts, based on the log data collected by the log collecting unit, log data with a connection count and intervals of communication in a predetermined time period satisfying a predetermined condition.

6. The network monitoring apparatus according to claim 3, wherein
  the log collecting unit collects, as the log data, information including the 5-tuples, the transmitted sizes, the received sizes, and the time stamps, and
  the log analyzing unit extracts, based on the log data collected by the log collecting unit, log data with transmitted and receives sizes of IP packets in a predetermined time period satisfying a predetermined condition.

7. The network monitoring apparatus according to claim 3, wherein
  the log collecting unit collects, as the log data, information including the 5-tuples, the destination URLs, the User-Agent, the request methods, and the time stamps, and
  the log analyzing unit extracts, based on the log data collected by the log collecting unit, log data with header information of original communication included in the log data in a predetermined time period satisfying a predetermined condition.

8. A network monitoring method executed by a network monitoring apparatus, which is provided in a network that includes a FireWall provided on at least one of a connection point with an external network and an internal segment dividing point and a proxy server for Web access and that transfers IP packets, and which detects communication suspected to be unauthorized, the network monitoring method including:
  a log collecting process of collecting and storing log data from at least one of the FireWall and the proxy server; and
  a log analyzing process of
    making inquiry for log data with respect to the log collecting process,
    extracting, based on the collected log data, the log data which are in a predetermined time period satisfying a set analysis condition,
    analyzing, according to the set analysis condition, the log data, and
    outputting a candidate for unauthorized communication as a result of the analysis, wherein
  the log data stored by the log collecting process are information including at least one of: 5-tuples; transmitted sizes; received sizes; information extracted from http headers; and time stamps, and
  the information extracted from http headers includes at least one of: destination URLs; User-Agent; and request methods.

9. A non-transitory computer-readable recording medium having stored network monitoring program, which is provided in a network that includes a FireWall provided on at least one of a connection point with an external network and an internal segment dividing point and a proxy server for Web access and that transfers IP packets, and which detects communication suspected to be unauthorized, the network monitoring program causing a computer to execute a process comprising:
  a log collecting step of collecting and storing log data from at least one of the FireWall and the proxy server; and
  a log analyzing step of
    making inquiry for log data with respect to the log collecting step,
    extracting, based on the collected log data, the log data which are in a predetermined time period satisfying a set analysis condition,
    analyzing, according to the set analysis condition, the log data, and
    outputting a candidate for unauthorized communication as a result of the analysis, wherein
  the log data stored by the log collecting step are information including at least one of: 5-tuples; transmitted sizes; received sizes; information extracted from http headers; and time stamps, and
  the information extracted from http headers includes at least one of: destination URLs; User-Agent; and request methods.

* * * * *